United States Patent
Feng et al.

(10) Patent No.: US 9,485,300 B2
(45) Date of Patent: Nov. 1, 2016

(54) PUBLISH-SUBSCRIBE PLATFORM FOR CLOUD FILE DISTRIBUTION

(75) Inventors: Andrew An Feng, Cupertino, CA (US); Rohit Chandra, Los Altos, CA (US); Lakshmanan Suryanarayanan, Valencia, CA (US); Timothy R. Crowder, Altadena, CA (US); Victor J. Lam, Pasedena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 761 days.

(21) Appl. No.: 13/419,304

(22) Filed: Mar. 13, 2012

(65) Prior Publication Data

US 2013/0246560 A1  Sep. 19, 2013

(51) Int. Cl.
*G06F 15/16* (2006.01)
*H04L 29/08* (2006.01)
*H04L 29/06* (2006.01)
*G06Q 30/02* (2012.01)

(52) U.S. Cl.
CPC ............. *H04L 67/06* (2013.01); *G06Q 30/02* (2013.01); *H04L 29/06* (2013.01); *H04L 29/0809* (2013.01); *H04L 29/08072* (2013.01)

(58) Field of Classification Search
None
See application file for complete search history.

(56) References Cited

U.S. PATENT DOCUMENTS

| | | | |
|---|---|---|---|
| 5,913,032 A * | 6/1999 | Schwartz et al. | 709/213 |
| 2005/0149549 A1* | 7/2005 | Jaspers et al. | 707/102 |
| 2005/0183096 A1* | 8/2005 | Branigan et al. | 719/328 |
| 2006/0230054 A1* | 10/2006 | Moog | 707/102 |
| 2009/0144718 A1* | 6/2009 | Boggs et al. | 717/170 |
| 2010/0057835 A1* | 3/2010 | Little | 709/203 |
| 2011/0317305 A1* | 12/2011 | Thompson et al. | 360/49 |
| 2012/0310884 A1* | 12/2012 | Tennant | 707/627 |

\* cited by examiner

*Primary Examiner* — Abdullahi E Salad
*Assistant Examiner* — Van Kim T Nguyen
(74) *Attorney, Agent, or Firm* — Weaver Austin Villeneuve & Sampson LLP

(57) ABSTRACT

Methods and apparatus for managing file distribution between publishing and subscribing devices are provided. At a transporter system, a publish request for publishing a version of the dataset is received from a publisher device, wherein the publish request has a predefined format that includes an identity of the dataset, an identity of the version of the dataset, and an identity of a location for the version of the dataset. The transporter system updates a registry to associate the dataset with the identity of the dataset, version, and location, and the transporter system automatically publishes the dataset to any subscribers devices that have previously sent subscribe requests for such dataset to the transporter system.

21 Claims, 9 Drawing Sheets

PUBLISH-SUBSCRIBE PLATFORM FOR CLOUD FILE DISTRIBUTION

BACKGROUND OF THE INVENTION

The present invention relates to data processing systems, and more specifically to large-scale, long-running data transfer to data storage systems.

In cloud computing, files often are distributed from a producer to one or more geographically distributed consumers. Among the simplest examples is a single file needed by an application such as a configuration file, a whitelist/blacklist file, a data dictionary, or a mapping file that needs to be delivered to a handful of web servers. At the complex end of the spectrum, there could be an entire set of search indices that need to be distributed to serving clusters in multiple data centers.

Improved mechanisms for efficiently and reliably distributing files within a cloud network or any other distributed storage network would be beneficial.

SUMMARY OF THE INVENTION

Apparatus and methods for distributing files in a cloud network environment are disclosed. In general, a file distribution system utilizes a publish-subscribe model of notification, where publishers and consumers do not communicate directly with each other. Publishers publish new datasets, and consumers subscribe to and receive new datasets. However, publishers and subscribers do not need to know about each other. The file distribution system also incorporates a self-serve model, where the simple act of publishing makes a dataset available to any consumer, while the act of subscribing delivers data to the consumer. Thus, this arrangement does not require a system-level setup to support a new dataset between a new set of publishers and consumers.

In a specific implementation, a computer implemented method of managing file distribution between publishing and subscribing devices is disclosed. At a transporter system, a publish request for publishing a version of a dataset is received from a publisher device, wherein the publish request has a predefined format that includes an identity of the dataset, an identity of the version of the dataset, and an identity of a location for the version of the dataset. The transporter system updates a registry to associate the dataset with the identity of the dataset, version, and location, and the transporter system automatically publishes the version of the dataset to any subscribers devices that have previously sent subscribe requests for such dataset to the transporter system.

In a specific implementation, the publisher device has no knowledge of any subscriber devices to the dataset, and any subscriber devices to such dataset have no knowledge of the publisher device. In a further aspect, the transporter system generates a checksum for the dataset. The transporter system updates the registry to associate the generated checksum with the dataset, and the checksum is used to validate the version of the dataset prior to automatically publishing the version of the dataset, wherein the version of the dataset is only automatically published if the version of the dataset is valid.

In another embodiment, the transporter system stores the dataset in a cloud storage network. In yet another example implementation, the predefined format of the publish request further includes information specifying how long the version of the dataset is to retained by the transporter system and how many versions of the dataset are to be retained by the transporter system, and metadata specifying custom key/value pairs to be associated with the version of the dataset. In a further aspect, it is determined whether the publish request is for a duplicate version of the dataset that has already been published. An error message is sent to the publisher device if the publication request is for a duplicate version, and wherein the operation for updating and automatically publishing are only performed if the version of the publish request is determined to not be a duplicate version.

In another embodiment, at the transporter system, a subscribe request for the dataset is received from one or more subscribing devices, wherein the subscribe request has a predefined format that includes the identity of the dataset and a destination identity for receiving published updates of the dataset. After receiving each subscribe request, the transporter system updates the registry to associate the destination identity of such subscribe request with the identity of the dataset.

In another implementation, the operations for receiving from a publisher device, updating the registry, and automatically publishing are repeated for a plurality of publish requests for different datasets and different dataset versions from a plurality of different publisher devices. The operations for receiving from one or more subscriber devices and updating the registry for a plurality of subscribe requests are also repeated for the different datasets. If a query request to discover dataset versions is received, information is provided from the registry for one or more datasets to a sender of such query call. If a remove request for a particular identified dataset version is received from a publisher device, information for the particular identified dataset version is removed from the registry so that the particular identified dataset version is not published to any subscribers.

In a further aspect, the predefined format of the publish request further includes a namespace identity that is also associated with the dataset in the registry and the predefined format of each subscribe request for the dataset also includes the namespace identity, an executable and associated arguments for a command to be executed for each updated version of the dataset that is published, wherein the destination identity specifies a host device and a consumer identity. For each automatically published updated version of each dataset, the command associated with such dataset is automatically invoked at the specified host device.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Figure 1:
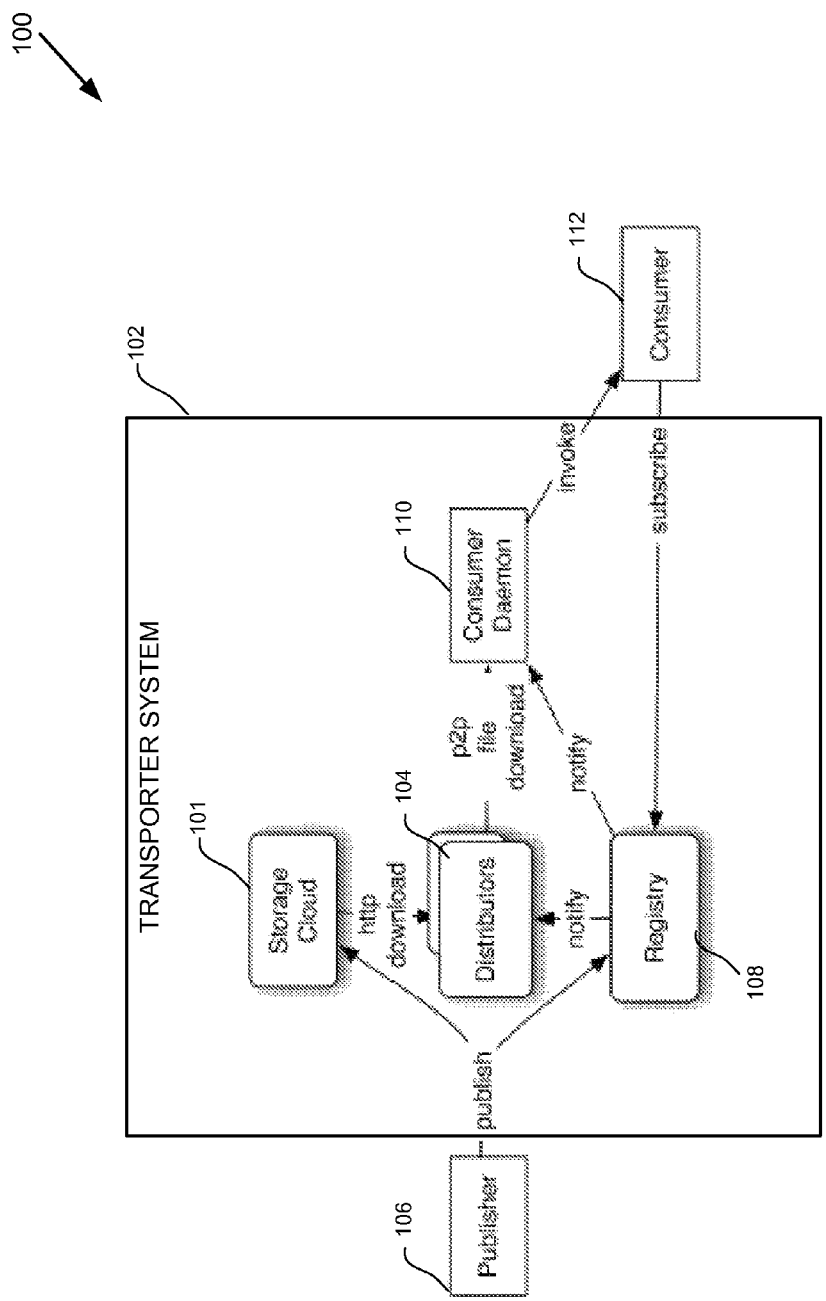
FIG. 1 is a simplified diagram of a network environment in which specific embodiments of the present invention may be implemented.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

To facilitate large data processing, a number of companies and institutions have developed distributed processing systems. A distributed system generally includes a high number of processing nodes running on clusters of multiple machines. The multiple processing nodes can implement large-scale data batch processing that is run in parallel over a large distributed system. These distributed processing systems generally provide greater reliability, throughput, and processing power than traditional data processing systems. Machines can be added to each cluster as needed, allowing the processing capability to grow as large as desired. Examples of large-scale distributed processing systems include Apache Software Foundation's Hadoop (map/reduce), Pig, or Hive, among others. Pig and Hive are high-level languages that compile to map/reduce.

In a cloud computing environment, a distributed processing system may provide the output data to a publicly available cloud network system or another private data processing system. Alternatively, the output data may be provided to a storage system that makes only a portion of the data available to other users. At some point in the execution of a distributed processing application, a set of nodes of the distributed processing system can receive input data (original or generated by other nodes) and output the data to an external system.

Distributing files between globally distributed systems is a basic need in many network environments. Some simple examples of distribution applications can include distributing a new configuration file to a bank of web servers, distributing an updated blacklist to a federation broker, or distributing a search index built on the grid to hundreds of search-serving nodes. At the complex end of the spectrum, there could be an entire set of search indices that need to be distributed to serving clusters in multiple data centers.

These examples range in complexity along many dimensions. First, the data being distributed can be a simple file having a few KB (kilobytes) size, or can be a more complex dataset with multiple files that each have a total size of hundreds of MB (megabytes). Second, the dataset can be a complete replacement of a previous version or can be an incremental update—perhaps with additions, updates, and deletes that need to be applied to a preexisting copy of the data in the application. Third, the file distribution can be a one-time operation performed when the system is first set up or the dataset is refreshed every few hours and needs to be distributed each time a fresh index is produced (as in the case of a search index). In another simple example, the data can be distributed to a handful of nodes in one data center. In another complex example (again as in the search example), the destination nodes are organized into clusters of hundreds of search nodes in multiple data centers, with each cluster having partitioned and replicated search indices, and with each partition being a distinct dataset.

There can be many different systems for file distribution. Some file distribution systems can take the form of custom solutions. Custom file distribution systems may be based on a variety of different transfer technologies, such as BitTorrent, rsync, multicast, HTTP, and MySQL. As a result these customs distribution systems differ in the setup required for a new distribution, as well as the size and scale of data transfers that such systems can support.

In certain embodiments of the present invention, a generic file distribution system that can be used in all of the aforementioned examples is provided. This file distribution system supports easy configuration and reconfiguration, without requiring significant amounts of manual configuration on both the publisher and the consumer fronts. Thus, the initial setup is significantly less expensive than a custom solution and subsequent changes are not fragile like some custom systems, e.g., new consumers sometimes not receiving new files, and older boxes continuing to receive files even when they had been repurposed for different roles over time.

In one specific implementation of the present invention, the roles of the producers of datasets and the consumers of datasets are generally decoupled and not directly connected. For example, producers of a dataset will not know about the consumers and vice-versa.

Specific implementations of the present invention enable files to be delivered with low latency, even in the face of various scaling dimensions. Scalability may be along multiple dimensions: the size of a dataset may range from a few KB to a few GB (or even higher); the number of consumers of a dataset may range in the hundreds (if not thousands or higher), spread across several data centers; the number of datasets themselves may number in the hundreds, as is true for web serving clusters today. For instance, an online ads serving cluster requires the distribution of a GB dataset to thousands of serving nodes. Done naively, this transport could take a few days to complete. Preferably, a distribution system can scale along these dimensions, is knowledgeable about and optimizes the data transport for the underlying network architecture, and thereby delivers datasets with low latency to the destination nodes as described further herein.

FIG. 1 is a simplified diagram of a network environment in which specific embodiments of the present invention may be implemented. As shown, the network 100 includes a Transporter System 102, multiple publishers 106, and consumers 112. In a specific implementation, the Transporter architecture may include a storage cloud 101, a plurality of distributors 104, a registry 108, and a consumer daemon 110, e.g., for each consumer.

The storage cloud 101 may generally provide a persistent and reliable storage cloud for dataset content, e.g., the data files for all dataset versions. Transporter 102 may be configured to operate with different storage services. For example, the storage cloud 101 may include storage clouds in the form of MObStor from Yahoo! Inc. of Sunnyvale, Calif. or Simple Storage Solutions from Amazon of Seattle, Wash.

The registry 108 may be used to maintain a directory of all datasets and their subscriptions, which can also be utilized to notify only the interested subscribers in response to each new publishing event. The registry can also be used to store metadata associated with dataset versions. The registry may take any suitable form for maintaining the datasets and their subscriptions. For example, Apache ZooKeeper from the Apache Software Foundation may be used to maintain this registry and to notify subscribers when there is a new dataset. ZooKeeper provides an open source centralized configuration service and naming registry for large distributed systems. ZooKeeper's architecture also supports high-availability through redundant services for handling failovers.

In one implementation, ZooKeeper nodes store their data in a hierarchical name space, much like a file system or a trie datastructure. A trie, or prefix tree, is an ordered tree data structure that is used to store an associative array having keys that typically take the form of strings. Unlike a binary search tree, no node in the tree stores the key associated with that node. Instead, a node's position in the tree defines the key it is associated with. All the descendants of a node have a common prefix of the string associated with that node, and the root is associated with the empty string. Values do not have to be associated with every node, only with leaves and some inner nodes that correspond to keys of interest. Clients can read and write from/to the nodes and in this way have a shared configuration service.

The one or more distributors 104 can be configured to be responsible for efficient transfer of datasets from the storage system 101 to all the destination consumer nodes, e.g., 112. A two-tier distribution system can be used. For instance, data can first be distributed to each data center via storage cloud, and data distributors in each data center can then distribute the data to all (or a portion of) consumer nodes in that data center. Multiple distributors can be used in each data center. Generally, at least one distributor is informed to download a particular dataset from the storage cloud for a new version of the particular dataset. Distributors could have multiple assistants to help with the file distribution to consumers. For example, one assistant can be used for each aggregation switch so that consumers only download files from assistants within their network aggregation topology.

Each distributor may implement any suitable protocol for efficiently informing consumers of a versioned dataset (e.g., particular version of a dataset). For example, a distributor can conceptually divide a dataset into a plurality of chunks and then notify individual consumers from a particular data center about a particular chunk of the dataset. The consumers could then be configured to share the chunks with each other using any peer-to-peer communication protocol. In one implementation, BitTorrent is used as the base communication protocol for file distribution from distributors to consumers within a single data center. BitTorrent enables support for a high number of consumers since consumers could share dataset segments with each other. In another implementation, Rsync or RPC is used as the base communication protocol for file sharing from distributors to consumers.

A consumer daemon 110 may run on the destination nodes and be configured to download data files to the destination nodes. Once the download is complete, the consumer daemon 110 can then invoke a registered executable command on behalf of the consumer application, as explained further herein.

The registry 108 of the Transporter 102 may include a directory of datasets with associated subscribers and a mechanism to notify consumers when new datasets become available, as further describe herein. In one example, the Transporter registry 108 is implemented using ZooKeeper.

The Transporter system 102 may be configured to handle publication requests from a plurality of publisher clients, e.g., 106, as well as handle subscription requests from a plurality of consumer clients, e.g., 112. The Transporter 102 can generally be described through a simple example of a dataset that maps city names to zip codes. A publisher can initially define a dataset and create a database. The publisher can store the dataset data files, along with metadata, in local reliable storage. Destination servers can be configured to perform a lookup and subscribe to the dataset.

The Transporter system generally ensures that datasets are efficiently and accurately delivered. The publisher occasionally updates a dataset and publishes a revised dataset. When a revision happens, the Transporter system ensures that this revision is also delivered to all consumers. In this simple example, each version replaces the previous version. That is, each version can be a point-in-time snapshot of the dataset.

In a specific implementation, the Transporter system does not impose any relationship among versions. In one embodiment, it can also be possible for one version to be a snapshot of the dataset, and several subsequent versions to be much smaller deltas to that snapshot, followed eventually by a new snapshot. The Transporter system can simply be configured to deliver the files of the published dataset, and it is the responsibility of the consuming application to replace, combine, or otherwise process the files as they arrive.

Figure 2:
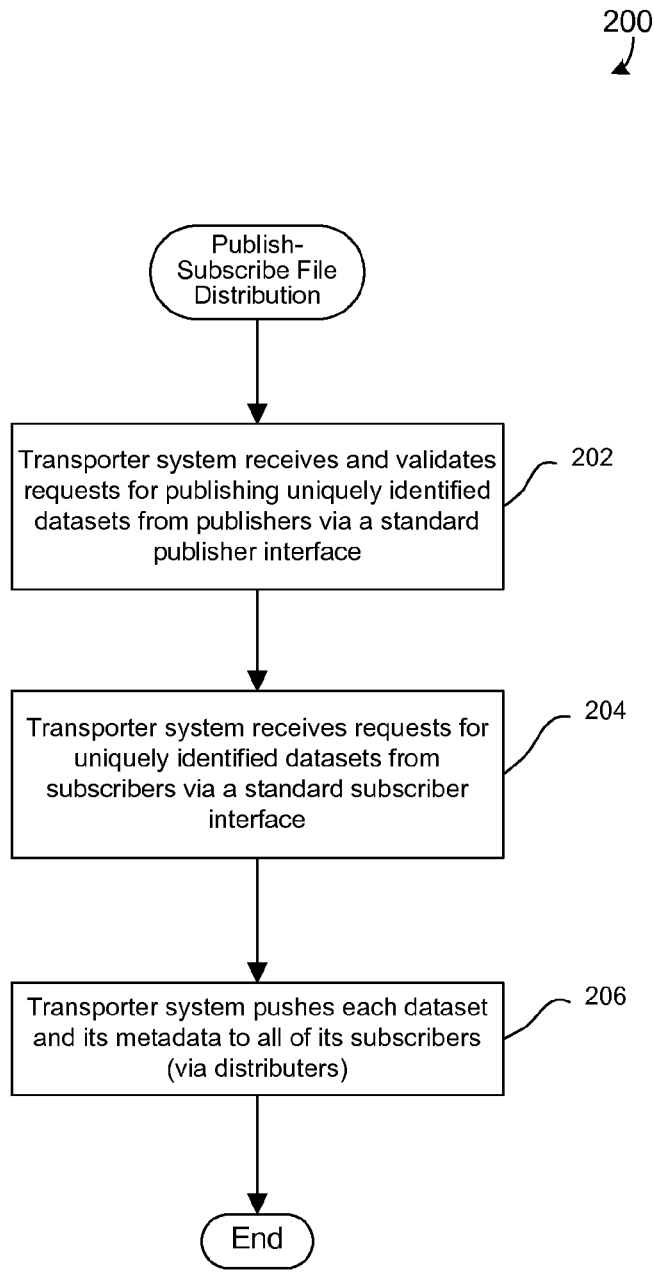
FIG. 2 is a flow chart illustrating a publish-subscribe file distribution procedure in accordance with a specific implementation.

FIG. 2 is a flow chart illustrating a publish and subscribe file distribution procedure in accordance with a specific implementation. Initially, a Transporter system may receive and validate requests for publishing uniquely identified datasets from publishers via a standard publisher interface in operation 202. Dataset validation is described further below.

Any suitable interface that accepts a standard set of input regarding a particular publication may be utilized. In general, the set of input may include a publication identity that uniquely identifies the particular publication, including version and location information, and that identifies particular policy regarding such publication, such as retention policy and verification information. In one embodiment, a publisher requests to publish a particular dataset via a standard API (application programming interface) in the form of a "publish" request with the following input parameters: publish(namespace ID, dataset ID, version ID, local file path, retention, metadata).

The "version ID" can take the form of any suitable identifier for uniquely identifying a particular publication version within a given dataset. For example, the "version ID" may be a string uniquely identifying the version for which the publish request pertains. The "local file path" may indicate the location of data files for the dataset version in a local file system. The "retention" may specifies, for example, (1) how long this version should be retained in the Transporter system in units of minutes, and (2) the number of versions to be retained for the current dataset. The "metadata" of the request may include any suitable set of key/value pairs that are to be associated as application metadata with this new published dataset version. Example key/value pairs may include "data format" to indicate the data format used in the data files, and "replacement-or-patch" to indicate whether the previous dataset version should be replaced by the new version or be patched with the new version, etc. Each dataset may have its specific key/value collection, which is preferably known to both publishers and consumers.

The Transporter system may also receive requests for uniquely identified datasets from subscribers via a standard subscriber interface in operation 204. For example, users may subscribe to already published datasets. Any suitable interface that accepts a standard set of input regarding a particular subscription may be utilized. In general, a subscriber may send a subscriber request to the Transporter, and such subscriber request may uniquely identify a particular dataset, the destination to which the subscription is to be received, and any other information for handling the dataset at the destination. In one embodiment, a subscriber requests to receive a subscription to a particular dataset via a standard API that takes the form of a "subscribe" request with the following input parameters: subscribe(namespace ID, dataset ID, consumer host, consumer ID, consumer executable, args, initial version).

The namespace ID and dataset ID may both serve to identify the particular namespace for a particular dataset. The "consumer host" parameter may identify the hostname or IP address of the consumer. This parameter can allow a third-party node, such as a cluster manager, to subscribe on behalf of all the data serving nodes in the cluster. The "consumer ID" may be a unique identifier for distinguishing consumers on a host. This parameter may enable multiple consumers on a host and allow each consumer to be subscribed/unsubscribed independently.

The "consumer executable" may identify a particular command that is to be invoked on the destination node when the new dataset version arrives at such destination node. That is, a particular command may be invoked to perform one or more application-defined steps that are deemed necessary to process the new dataset. The "args" parameters may be a list of command-line arguments to be used while invoking the identified consumer executable. In an alternative embodiment, the subscribe request may include more than one command executable and associated "args" to be invoked for processing the particular dataset at the destination. An order of invoking such consumer executable commands may also be specified in the subscribe request or the order may be predefined (e.g., processed in an order from first listed to last listed).

The last parameter "initial version" may indicate the initial version that is to be delivered to the consumer. The initial version could be the version ID of a dataset (which may be previously published, or will be published in future).

The Transporter system may also be configured to push each published new or updated dataset and its associated metadata to all its corresponding subscribers in operation 206. Transporter may generally be configured to ensure that published datasets are distributed to all subscribed consumers. In one example, one or more distributer devices are used to push published datasets to each subscribed consumer.

The Transporter may also have several additional API calls for consumers, in addition to publish and subscriber calls, such as query calls to discover datasets and versions, and APIs for publishers and consumers to cancel publication and subscription. When a query call is received from a sender, the Transporter can be configured to send information for one or more datasets and associated versions from the registry to the sender of such query call. This information can be filtered to exclude information that has already been sent to a particular sender.

Figure 3A:
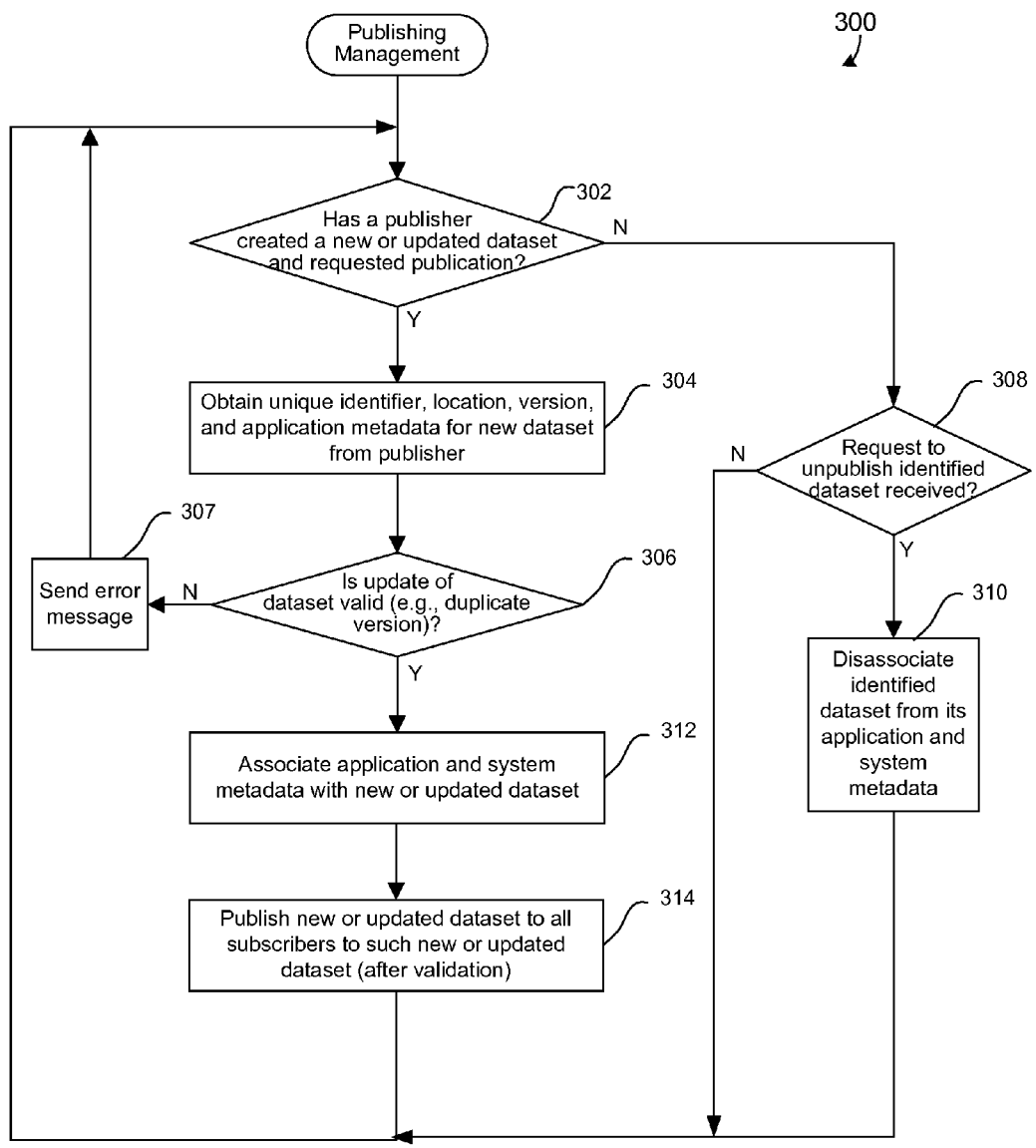
FIG. 3A is a flow chart illustrating a procedure for publishing management in accordance with a specific embodiment.

The Transporter may handle a publish request/call in any suitable manner. FIG. 3A is a flow chart illustrating a procedure for publishing management in accordance with a specific embodiment. Initially, it may be determined whether a publisher has created a new or updated dataset and has requested publication in operation 302. For instance, it may be determined whether a publish request/call has been received by the Transporter. If a publisher is creating or publishing a new dataset, a unique identifier, location, version, and application metadata for the new or updated dataset may also be obtained from the publisher in operation 304. For example, this information is obtained from the publish request parameters.

It then may be determined whether an update of the dataset (if any) is valid in operation 306. For example, it may be determined whether the publisher is attempting to make a duplicate version. That is, the Transporter can be configured to reject re-publishing the same dataset version. In this embodiment, a particular published dataset version is immutable; such that once a version is published, it cannot be modified. In further aspects of the invention, the publisher could remove an unwanted version via the unpublish( ) API, and then invoke publish( ) to publish new versions (of the removed version).

If the update dataset is not valid, an error message may then be sent in operation 307. Otherwise, application and system metadata may then be associated with the new or updated dataset in operation 312. For instance, the Transporter may also be configured to associate system metadata with the new dataset version upon publish( ) invocation. For example, the system metadata may include a checksum (e.g., checksum of data files and application metadata). A checksum determination may be implemented by Transporter to detect unexpected modification or corruption of the dataset. The system metadata may also include file names for the files within the particular published dataset.

The new or updated dataset may then be published to all subscribers to such new or updated dataset in operation 314. That is, the new or updated dataset is pushed to each subscriber, as described further below. Each subscriber may optionally be validated prior to pushing the published dataset to such subscriber.

It may also be determined whether a request to unpublish an identified dataset has been received in operation 308. If such a request has been received, the identified dataset may then be disassociated from its associated application and system metadata in operation 310.

Figure 3B:
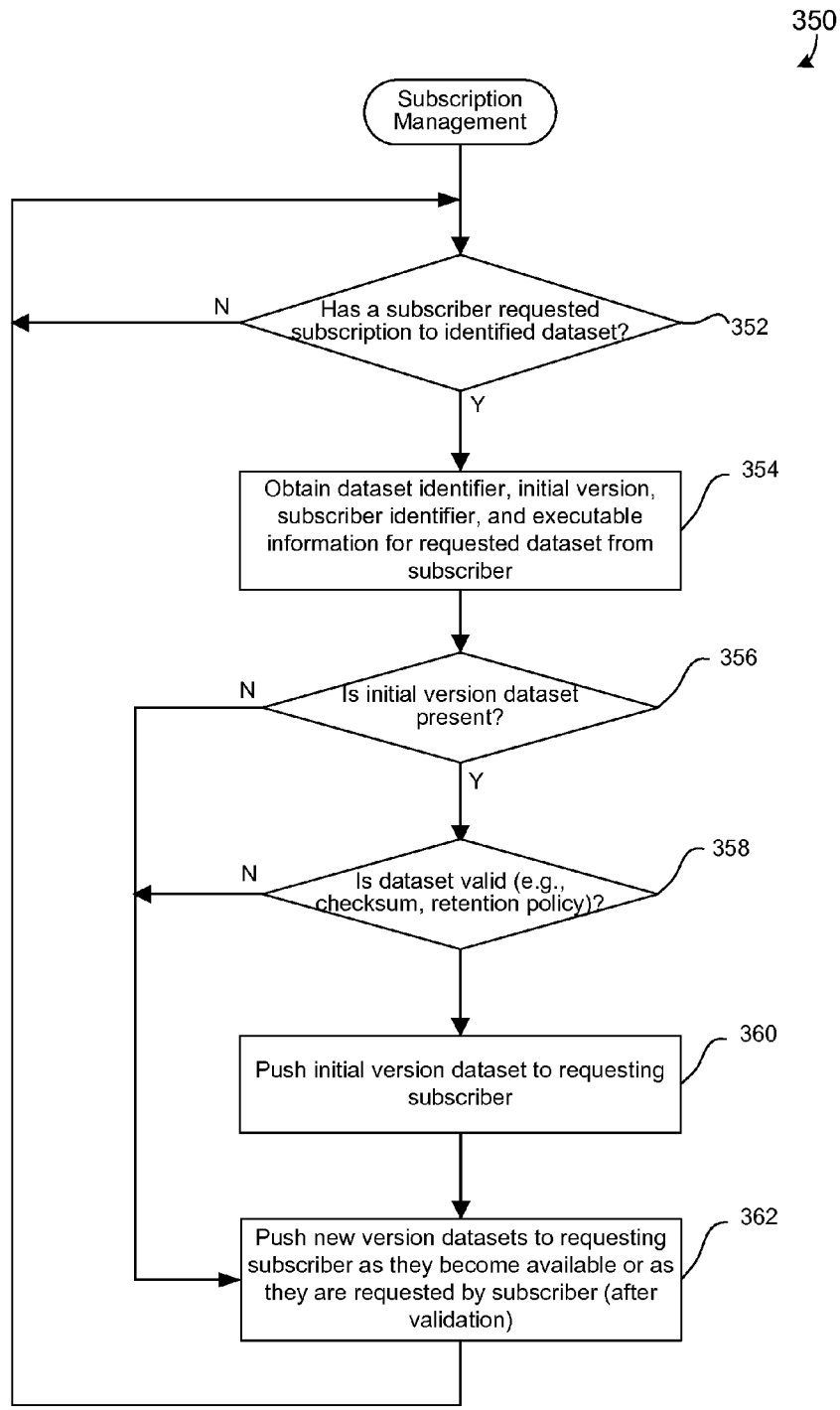
FIG. 3B is a flow chart illustrating a procedure for subscription management in accordance with a specific embodiment.

Subscription management for each published dataset may be handled by the Transporter system in any suitable manner. FIG. 3B is a flow chart illustrating a procedure for subscription management 350 in accordance with a specific embodiment. Initially, it may be determined whether a subscriber has requested a subscription to an identified dataset in operation 352. For example, it may be determined whether a potential subscriber has sent a subscribe( ) request/call. The procedure 350 may continue to wait for a subscriber request.

When a subscribe request is received, the Transporter may also obtain a dataset identifier, initial version, subscriber identifier, and executable information for the requested dataset from the subscriber in operation 354. For instance, parameters, as described herein, are obtained from the subscribe( ) request.

It may then be determined whether the initial version dataset of the subscribe request is present in operation 356. If the initial version is present, it may then be determined whether the dataset is valid in operation 358. For example, it may be determined whether the check sum and retention policy for such identified initial version are met. After the initial version dataset is determined to be valid, such initial version dataset may then be pushed to the requesting subscriber in operation 360. Otherwise, if the initial version dataset is not present or invalid, operations 358 and 360 may be skipped.

New version datasets may also be pushed to requesting subscribers as they become available or as they are requested specifically by the subscriber in operation 362. The new version datasets may also be validated, for example, as described for operation 358.

When a version of a subscribed-to dataset is ready for a consumer, the Transporter can perform the following tasks on the consumer host, by way of example implementation: (i) ensure the content integrity by examining the checksum, (ii) set shell variables, e.g., ns, ds, ver, dir with appropriate values, where ns represents the namespace identity for the dataset, ds represents the dataset identity, ver represents the dataset version identity, and dir represents the location of the dataset version files, as well as an associated metadata file, and (iii) invoke the registered executable command.

The consumer command executable can generally be configured to read the metadata file transporter.meta, and retrieve data files. The metadata file can contain both system attributes (e.g., checksum) and application metadata that is provided in the publish( ) request.

Figure 4:
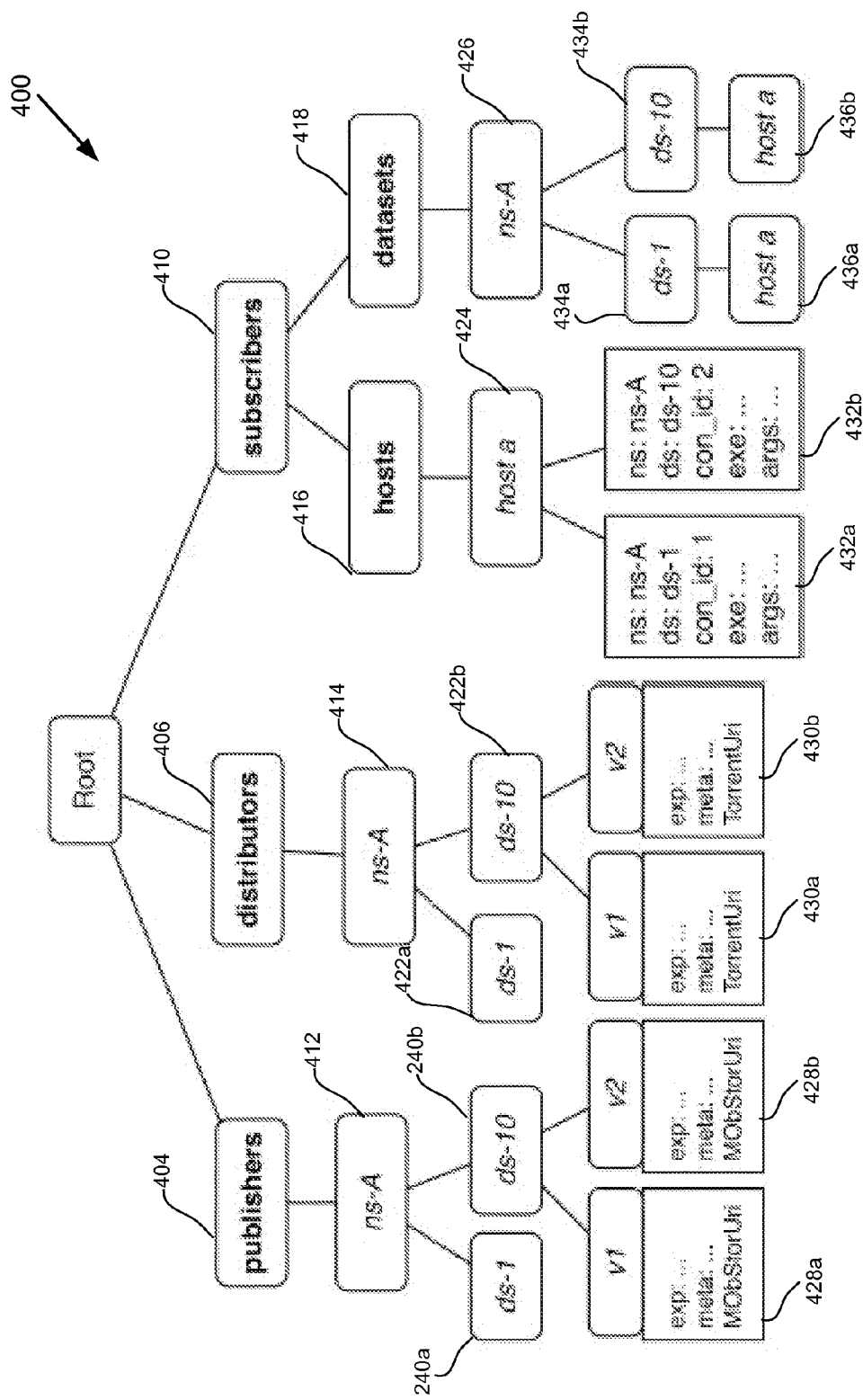
FIG. 4 is a diagrammatic representation of a system registry in accordance with one example.

Any suitable data structure may be used to implement a registry for retaining dataset information for publishers and subscribers for use by the Transporter. FIG. 4 is a diagrammatic representation of a system registry in accordance with one example. As shown, the registry may have three subtrees: a subscribers subtree 410, a publishers subtree 404, and a distributors subtree 406. The subscribers subtree 410 may generally contain a list of consumers and their subscription information. The publishers subtree 404 may contain a list of available dataset versions that have been published by various publishers. The distributors subtree 406 may contain a list of dataset versions that are available to be downloaded from distributors.

Specifically, each publisher may be associated with one or more namespaces (e.g., 412) for one or more published datasets (e.g., 240a, 240b). Although only one namespace "ns-A" is shown, each publisher may publish dataset for any suitable number of namespaces, and multiple publishers may each have one or more namespaces. Each publisher's dataset may also be associated with one or more znodes (e.g., 428a, 428b) corresponding to different dataset versions. Each znode may contain an expiration parameter (for dataset retention), associated metadata, and a location for such dataset, for example with respect to cloud storage or any suitable storage type.

The distributor tree 406 may likewise be associated with one or more namespaces (e.g., 414) for one or more published datasets (e.g., 422a and 422b). Each distributor dataset may be associated with a znode (e.g., 430a and 430b) for each dataset version, and each dataset version can be associated with an expiration date, metadata, and a location, for example, of the dataset with respect to a BitTorrent system.

The subscribers tree 410 may be associated with a plurality of hosts 416, where each host is identified by a particular host identity (e.g., 424) that is associated with one or more dataset versions (e.g., 432a and 432b). Each host's dataset version may be associated with a corresponding namespace, dataset identity, consumer identity, executable command, and arguments for such command. The subscribers tree 410 may also be associated with a dataset tree 418, which is associated with one or more namespaces (e.g., 426), where each namespace can be associated with one or more datasets (e.g., 434a and 434b), which can each also be associated with one or more hosts (e.g., 436a and 436b).

A publish( ) request or call may produce a metadata file containing system metadata (e.g., checksum) and application metadata. The Transporter can then upload the data files onto the storage cloud with the appropriate retention specification. The Transporter can then announce this new dataset version by creating a node in the publishers subtree in the Transporter registry. This znode contains metadata associated with the dataset version. The Transporter can also remove unwanted old versions from storage and registry.

Once a dataset version is published in the Transporter registry, all distributors can be notified of the availability of this new version. For example, N distributors (per configuration) can be selected to download the new dataset version (data files) from the storage cloud. The distributor can ensure content integrity by examining the associated checksum. The distributor may then produce a downloadable file (e.g., .torrent file), and announce such file in the distributor's subtree in the Transporter registry. Distributors may also be configured to ensure that expired datasets are removed from Transporter storage and the registry.

The registry update of a downloadable file can also trigger a notification to the subscribed consumer's daemon. For instance, the consumer daemons may use the BitTorrent library to download files from distributors and peers. Upon the completion of file download, the consumer's executable command can be invoked automatically on the receiving host device.

Figure 5:
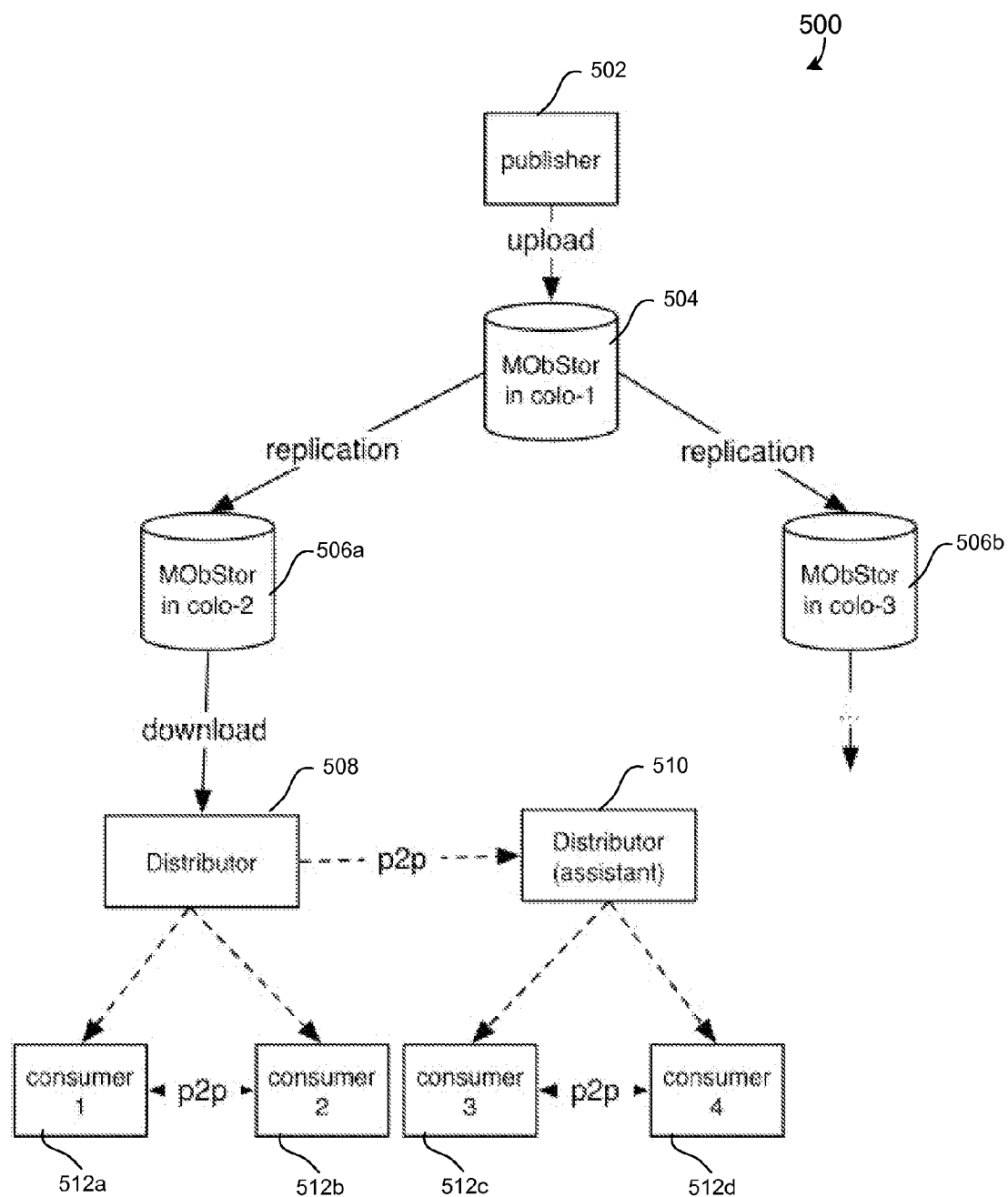
FIG. 5 illustrates a transporter file flow in accordance with one embodiment of the present invention.

FIG. 5 illustrates a Transporter file flow in accordance with one embodiment of the present invention. For example, a file is initially uploaded (by the Transporter) from a publisher 502 to cloud storage, such as a MObStor storage solution. A BitTorrent protocol can be applied for intra-datacenter distribution, e.g., replicated for all relevant distributors in storage 506a and 506b, from distributors 508 to consumers 512a-512d.

Distributors could have multiple assistants 510 to help with the file distribution to consumers. For example, one assistant can be used for each aggregation switch, and require that consumers only download files from assistants within their network aggregation topology. Such a configuration could help avoid downloading data across switches. Consumers can also use peer-to-peer sharing of the downloaded datasets.

In certain embodiments, the Transporter architecture ensures that data files are delivered with low latency, independent of whether they are published on-demand or per schedule. Data availability events are sent to distributors, consumer daemon, and consumers through proactive pushes. Distributors and their assistants can enable quick deliver and replication of datasets to consumers, e.g., via BitTorrent.

In a particular implementation, at least one distributor assistant can be provided for each dataset distributer so as to provide redundancies in the event of system or network failures. When a distributor becomes unavailable, one of its assistants can become a new distributor.

Certain Transporter architecture embodiments are designed to support various different use cases. For example, publishers can be short lived, e.g., the publisher is a job on Hadoop. These types of publishers may disappear after the completion of a job, e.g., a Hadoop job. In another use, a publisher is located in a private network such as the corp data center. Such publishers may not accept incoming connections.

Certain Transporter implementations may support a range of design patterns. A simple use case would be pushing a small configuration file to a handful of nodes. A more complex example would require pushing a large file to a large number of nodes in multiple data centers. Another use case is the search example, where the destination nodes form a two-dimensional cluster with the data partitioned across distinct partitions and replicated across multiple instances of the same partition. Finally, in another variation a new version of a dataset is not a full replacement but rather an incremental update (or delta) from the previous dataset.

In certain embodiments, a publish-subscribe paradigm, in which producers and consumers of a dataset have no knowledge of each other, is provided so that the connections are implicitly formed only through shared datasets. The Transporter manages these implicit connections and retains datasets for a period of time, while explicit decoupling of publishers and consumers is maintained. This decoupling allows the publishers and subscribers to have no knowledge of each other and provides a clean separation of functionality between these different roles.

Certain Transporter embodiments can provide a "self-serve" system (or a close approximation thereof) where the initial setup, as well as the inevitable ongoing role changes, can be performed with no manual intervention. The act of publishing and consuming is generally programmatic, with these operations automatically performing the requisite setup of a dataset. In contrast, manual steps for setting up or retiring a consumer node can result in a mistake and result in a node not receiving fresh data or continuing to receive unnecessary data updates long after its function in life has changed. By making the publish and subscribe actions programmatic and part of the application, the Transporter system can automatically adjust to reconfigurations.

Additionally, a Transporter system can be scalable and can deliver files with low latency, even in the face of various scaling dimensions. The scalability can be facilitated along multiple dimensions. For example, the size of a dataset may range from a few KB to a few GB; the number of consumers of a dataset may range in the hundreds (if not thousands), spread across several data centers; the number of datasets themselves may number in the hundreds or more, e.g., for our web-search serving clusters.

Certain Transporter system embodiments are easily accessible by publishers and consumers via a simple publish-subscribe API for distributing versions of datasets. Built-in support of versions also enables publishers and consumers to handle revisions of datasets efficiently, for example, by distributing only delta changes in each version. Since certain Transporter embodiments follow a push-based model that pushes dataset versions to consumers that have subscribed to the given dataset, low latency can be achieved.

In certain embodiments, a Transporter system is a reliable distribution channel with a storage system that is used to support a retention policy for datasets. Publishing datasets to buffered storage can enable datasets to be consumed asynchronously. As a result, publishers can move on to other duties once the dataset is published onto the storage. Thus, publishers do not need to wait for consumers. Certain Transport embodiments also can enable new consumers to retrieve previously published dataset versions.

Network

Embodiments of the present invention may be implemented in any suitable network environment. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable storage media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of subnetworks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 6:
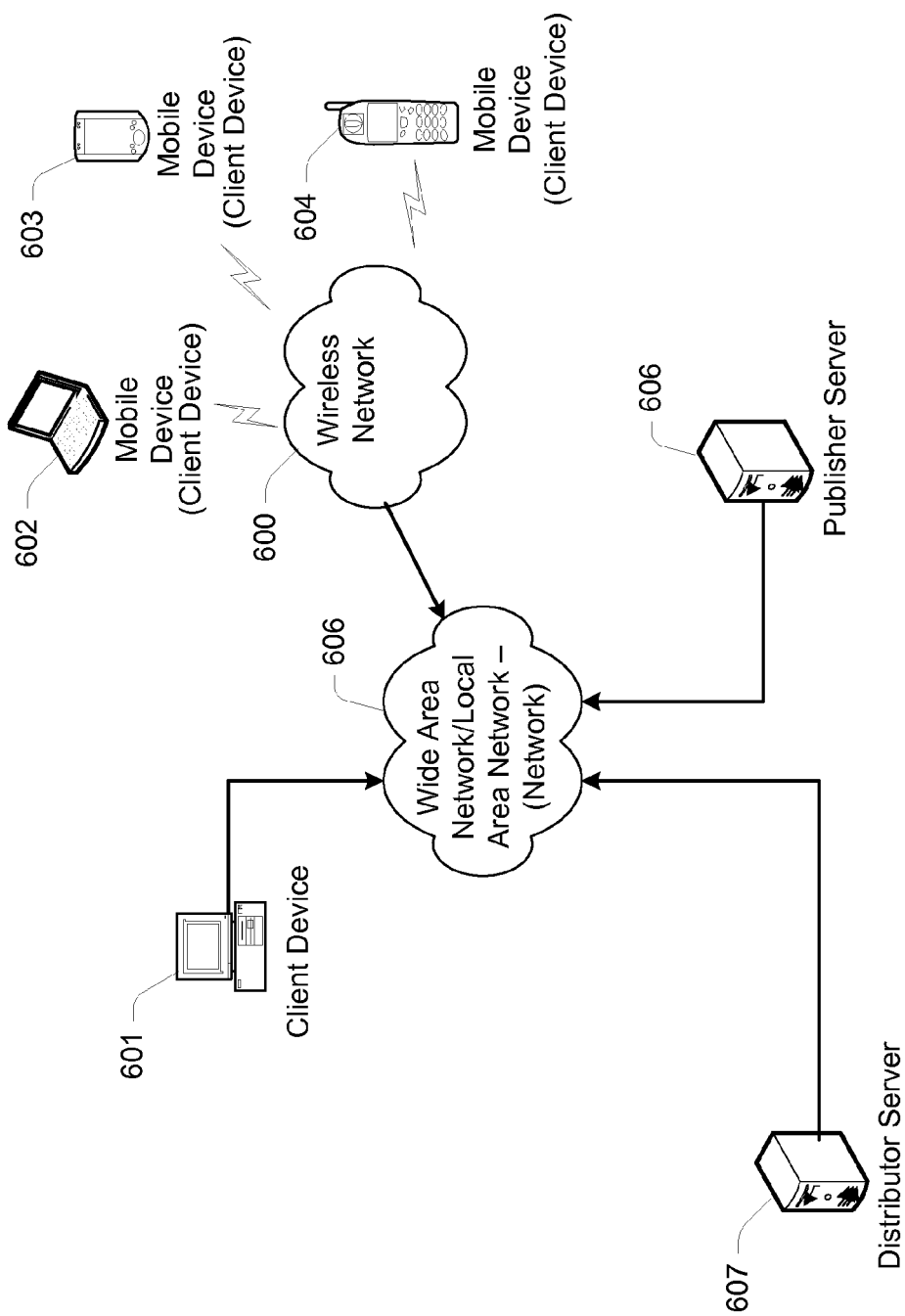
FIG. 6 is a schematic diagram illustrating an example embodiment of a network.

The disclosed embodiments may be implemented in any of a wide variety of computing contexts. FIG. 6 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 6, for example, includes a variety of networks, such as a LAN/WAN 606 and wireless network 600, a variety of devices, such as client devices 601-604, and a variety of servers such as distributor server(s) 607 and publisher server 606. As shown in this example, the client devices 601-604 may include one or more mobile devices 602, 603, 604. Client device(s) 601-604 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

Publish and subscribe requests may be processed and implemented according to the disclosed embodiments in some centralized manner. This is represented in FIG. 6 by distributor server 607, which may correspond to multiple distributed devices and data store(s). The distributor server 607 and/or corresponding data store(s) may be configured to generate, store, and manage publisher, subscriber, dataset, and distributor information.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Client Device

Figure 7:
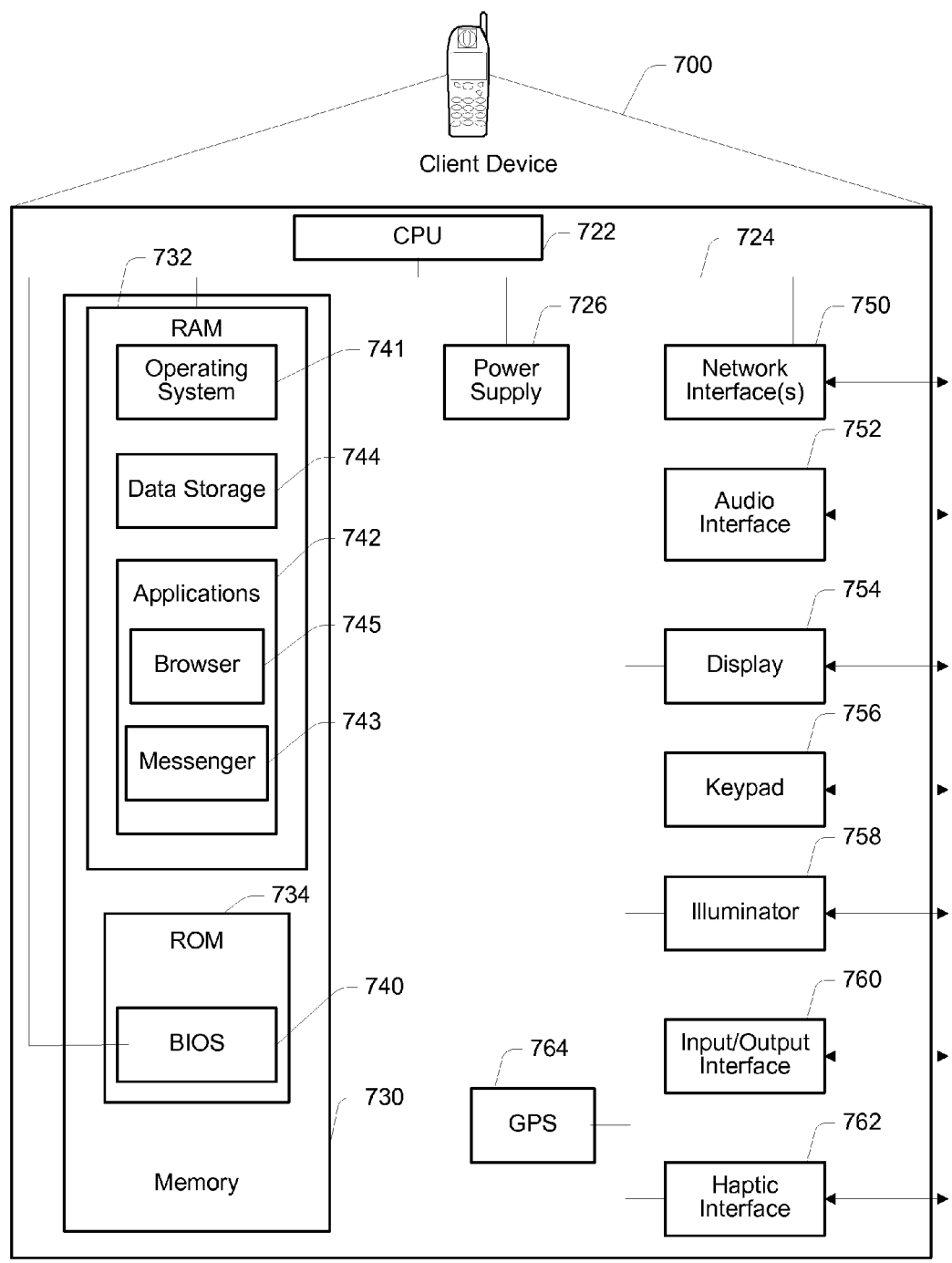
FIG. 7 is a schematic diagram illustrating an example embodiment of a client device in which various embodiments may be implemented.

FIG. 7 is a schematic diagram illustrating an example embodiment of a client device in which various embodiments may be implemented. For example, a client device may be configured to generate and send a publish( ) subscribe( ) or other types of requests and messages to a Transporter system. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

As shown in this example, a client device 700 may include one or more central processing units (CPUs) 722, which may be coupled via connection 724 to a power supply 726 and a memory 730. The memory 730 may include random access memory (RAM) 732 and read only memory (ROM) 734. The ROM 734 may include a basic input/output system (BIOS) 740.

The RAM 732 may include an operating system 741. More particularly, a client device may include or may execute a variety of operating systems, including a personal computer operating system, such as a Windows, iOS or Linux, or a mobile operating system, such as iOS, Android, or Windows Mobile, or the like. The client device 700 may also include or may execute a variety of possible applications 742 (shown in RAM 732), such as a client software application such as messenger 743, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 700 may also include or execute an application to communicate content, such as, for example, textual content, multimedia content, or the like, which may be stored in data storage 744. A client device may also include or execute an application such as a browser 745 to perform a variety of possible tasks, such as browsing, searching, playing various forms of content, including locally stored or streamed video, or games (such as fantasy sports leagues).

The client device 700 may send or receive signals via one or more interface(s). As shown in this example, the client device 700 may include one or more network interfaces 750. The client device 700 may include an audio interface 752. In addition, the client device 700 may include a display 754 and an illuminator 758. The client device 700 may further include an Input/Output interface 760, as well as a Haptic Interface 762 supporting tactile feedback technology.

The client device 700 may vary in terms of capabilities or features. Claimed subject matter is intended to cover a wide range of potential variations. For example, a cell phone may include a keypad such 756 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 764 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Regardless of the system's configuration (e.g., client or server), it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the present invention relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which embodiments of the invention are implemented may be stored in any type of computer-readable storage media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 8:
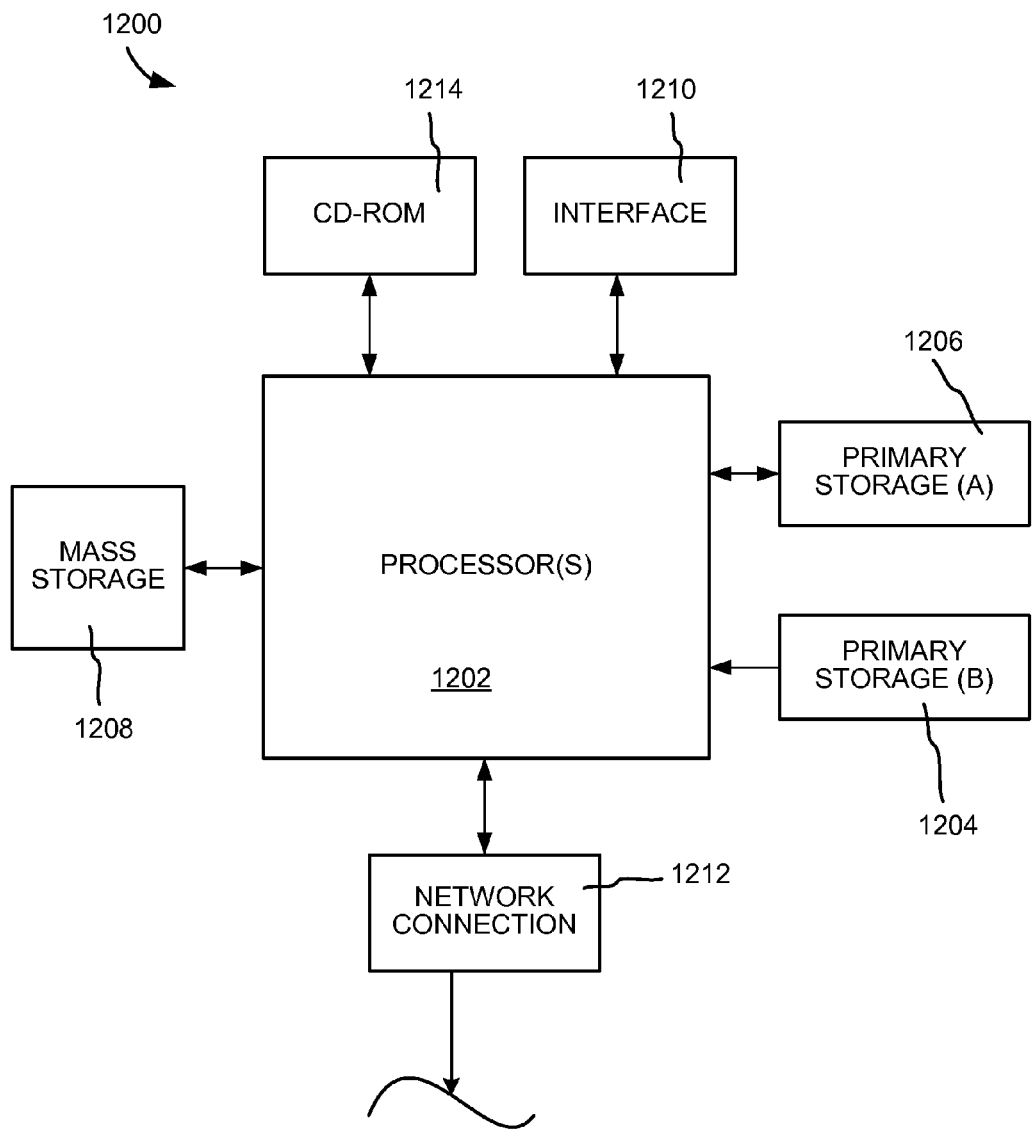
FIG. 8 illustrates a typical computer system that, when appropriately configured or designed, can serve as a system of this invention.

FIG. 8 illustrates a typical computer system that, when appropriately configured or designed, can serve as a system of this invention. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A computer implemented method of managing file distribution between publishing and subscribing devices, comprising:
    at a transporter system, receiving from a publisher device a publish request for publishing a version of a dataset, wherein the publish request has a predefined format that includes an identity of the dataset, an identity of the version of the dataset, and an identity of a location for the version of the dataset, wherein the version of the dataset includes a complete dataset or an incremental update to a previous version of the dataset;
    the transporter system updating a registry to associate the version of the dataset with the identity of the dataset, version, and location; and
    the transporter system publishing the version of the dataset to any subscribers devices that have previously sent subscribe requests for such dataset to the transporter system such that the complete dataset or incremental update to the previous version of the dataset is sent to the subscriber devices that have previously sent subscribe requests for such dataset to the transporter system;
    wherein the publisher device has no knowledge of any subscriber devices to the dataset, and any subscriber devices to such dataset have no knowledge of the publisher device.

2. The method of claim 1, the method further comprising:
    the transporter system generating a checksum for the version of the dataset;
    the transporter system updating the registry to associate the generated checksum with the version of the dataset; and
    using the checksum to validate the version of the dataset prior to automatically publishing the version of the dataset, wherein the version of the dataset is only automatically published if the versioned dataset is valid.

3. The method of claim 1, further comprising the transporter system storing the dataset in a cloud storage network, and wherein the transporter system is scalable along multiple dimensions, including dataset size, number of datasets, and number of subscribers to a dataset, and wherein automatically publishing includes the transporter system publishing to any subscribers directly or through multiple tiered distributors.

4. The method of claim 1, wherein the predefined format of the publish request further includes information specifying how long the versioned dataset is to be retained by the transporter system and how many versions of the dataset are to be retained by the transporter system, and metadata specifying custom key/value pairs to be associated with the versioned dataset, the method further comprising:
    determining whether the publish request is for a duplicate version of the dataset that has already been published; and
    sending an error message to the publisher device if the publication request is for a duplicate version, and
    wherein the operation for updating and automatically publishing are only performed if the version of the publish request is determined to not be a duplicate version.

5. The method of claim 1, further comprising:
    at a transporter system, receiving from one or more subscribing devices a subscribe request for the dataset, wherein the subscribe request has a predefined format that includes the identity of the dataset and a destination identity for receiving published updates of the dataset; and
    after receiving each subscribe request, the transporter system updating the registry to associate the destination identity of such subscribe request with the identity of the dataset.

6. The method of claim 5, further comprising:
    repeating the operations for receiving from a publisher device, updating the registry, and automatically publishing for a plurality of publish requests for different datasets and different dataset versions from a plurality of different publisher devices, wherein at least one dataset is published by notifying a plurality of associated subscribers of individual chunks of such dataset so that such subscribers can share the individual chunks with each other;
    repeating the operations for receiving from one or more subscriber devices and updating the registry for a plurality of subscribe requests for the different datasets;
    if a query request to discover dataset versions is received, providing information from the registry for one or more datasets to a sender of such query call; and
    if a remove request for a particular identified dataset version is received from a publisher device, removing information for the particular identified dataset version from the registry so that the particular identified dataset version is not published to any subscribers.

7. The method of claim 6, wherein the predefined format of the publish request further includes a namespace identity that is also associated with the dataset in the registry and the predefined format of each subscribe request for the dataset also includes the namespace identity, an executable and associated arguments for a command to be executed for each updated version of the dataset that is published, wherein the destination identity specifies a host device and a consumer identity, the method further comprising:

for each automatically published updated version of each dataset, automatically invoking the command associated with such dataset, wherein the command is invoked at the specified host device.

8. An apparatus comprising at least a processor and a memory, wherein the processor and/or memory are configured to perform the following operations:

receiving from a publisher device a publish request for publishing a version of a dataset, wherein the publish request has a predefined format that includes an identity of the dataset, an identity of the version of the dataset, and an identity of a location for the version of the dataset, wherein the version of the dataset includes a complete dataset or an incremental update to a previous version of the dataset;

updating a registry to associate the version of the dataset with the identity of the dataset, version, and location; and publishing the version of the dataset to any subscribers devices that have previously subscribed to such dataset such that the complete dataset or incremental update to the previous version of the dataset is sent to the subscriber devices that have previously sent subscribe requests for such dataset to the transporter system;

wherein the publisher device has no knowledge of any subscriber devices to the dataset, and any subscriber devices to such dataset have no knowledge of the publisher device.

9. The apparatus of claim 8, wherein the processor and/or memory are further configured for:

generating a checksum for the version of the dataset;

updating the registry to associate the generated checksum with the version of the dataset; and using the checksum to validate the version of the dataset prior to automatically publishing the version of the dataset, wherein the version of the dataset is only automatically published if the version of the dataset is valid.

10. The apparatus of claim 8, wherein the processor and/or memory are further configured for storing the dataset in a cloud storage network, and wherein the transporter system is scalable along multiple dimensions, including dataset size, number of datasets, and number of subscribers to a dataset, and wherein automatically publishing includes the transporter system publishing to any subscribers directly or through multiple tiered distributors.

11. The apparatus of claim 8, wherein the predefined format of the publish request further includes information specifying how long the version of the dataset is to be retained and how many versions of the dataset are to be retained, and metadata specifying custom key/value pairs to be associated with the version of the dataset, wherein the processor and/or memory are further configured for:

determining whether the publish request is for a duplicate version of the dataset that has already been published; and sending an error message to the publisher device if the publication request is for a duplicate version, and wherein the operation for updating and automatically publishing are only performed if the version of the publish request is determined to not be a duplicate version.

12. The apparatus of claim 8, wherein the processor and/or memory are further configured for:

receiving from one or more subscribing devices a subscribe request for the dataset, wherein the subscribe request has a predefined format that includes the identity of the dataset and a destination identity for receiving published updates of the dataset; and after receiving each subscribe request, updating the registry to associate the destination identity of such subscribe request with the identity of the dataset.

13. The apparatus of claim 12, wherein the processor and/or memory are further configured for:

repeating the operations for receiving from a publisher device, updating the registry, and automatically publishing for a plurality of publish requests for different datasets and different dataset versions from a plurality of different publisher devices, wherein at least one dataset is published by notifying a plurality of associated subscribers of individual chunks of such dataset so that such subscribers can share the individual chunks with each other;

repeating the operations for receiving from one or more subscriber devices and updating the registry for a plurality of subscribe requests for the different datasets;

if a query request to discover dataset versions is received, providing information from the registry for one or more datasets to a sender of such query call; and if a remove request for a particular identified dataset version is received from a publisher device, removing information for the particular identified dataset version from the registry so that the particular identified dataset version is not published to any subscribers.

14. The apparatus of claim 13, wherein the predefined format of the publish request further includes a namespace identity that is also associated with the dataset in the registry and the predefined format of each subscribe request for the dataset also includes the namespace identity, an executable and associated arguments for a command to be executed for each updated version of the dataset that is published, wherein the destination identity specifies a host device and a consumer identity, wherein the processor and/or memory are further configured for:

for each automatically published updated version of each dataset, automatically invoking the command associated with such dataset, wherein the command is invoked at the specified host device.

15. A computer program product for managing file distribution between publishing and subscribing devices, comprising at least one non-transitory computer-readable storage medium having computer instructions stored therein which are operable to cause a computer device to perform the following operations:

receiving from a publisher device a publish request for publishing a version of a dataset, wherein the publish request has a predefined format that includes an identity of the dataset, an identity of the version of the dataset, and an identity of a location for the version of the dataset, wherein the version of the dataset includes a complete dataset or an incremental update to a pervious version of the dataset;

updating a registry to associate the version of the dataset with the identity of the dataset, version, and location; and publishing the version of the dataset to any subscriber devices that have previously subscribed to such dataset such that the complete dataset or incremental update to the previous version of the dataset is sent to the subscriber devices that have previously sent subscribe requests for such dataset to the transporter system;

wherein the publisher device has no knowledge of any subscriber devices to the dataset, and any subscriber devices to such dataset have no knowledge of the publisher device.

16. The computer program product of claim 15, wherein the computer instructions are further operable to cause a computer device to perform the following operations:
generating a checksum for the version of the dataset;
updating the registry to associate the generated checksum with the version of the dataset; and
using the checksum to validate the version of the dataset prior to automatically publishing the version of the dataset, wherein the version of the dataset is only automatically published if the version of the dataset is valid.

17. The computer program product of claim 15, wherein the computer instructions are further operable to cause a computer device to store the dataset in a cloud storage network, and wherein the transporter system is scalable along multiple dimensions, including dataset size, number of datasets, and number of subscribers to a dataset, and wherein automatically publishing includes the transporter system publishing to any subscribers directly or through multiple tiered distributors.

18. The computer program product of claim 15, wherein the predefined format of the publish request further includes information specifying how long the version of the dataset is to be retained and how many versions of the dataset are to be retained, and metadata specifying custom key/value pairs to be associated with the version of the dataset, wherein the computer instructions are further operable to cause a computer device to perform the following operations:
determining whether the publish request is for a duplicate version of the dataset that has already been published; and
sending an error message to the publisher device if the publication request is for a duplicate version, and
wherein the operation for updating and automatically publishing are only performed if the version of the publish request is determined to not be a duplicate version.

19. The computer program product of claim 15, wherein the computer instructions are further operable to cause a computer device to perform the following operations:
receiving from one or more subscribing devices a subscribe request for the dataset, wherein the subscribe request has a predefined format that includes the identity of the dataset and a destination identity for receiving published updates of the dataset; and
after receiving each subscribe request, updating the registry to associate the destination identity of such subscribe request with the identity of the dataset.

20. The computer program product of claim 19, wherein the computer instructions are further operable to cause a computer device to perform the following operations:
repeating the operations for receiving from a publisher device, updating the registry, and automatically publishing for a plurality of publish requests for different datasets and different dataset versions from a plurality of different publisher devices, wherein at least one dataset is published by notifying a plurality of associated subscribers of individual chunks of such dataset so that such subscribers can share the individual chunks with each other;
repeating the operations for receiving from one or more subscriber devices and updating the registry for a plurality of subscribe requests for the different datasets;
if a query request to discover dataset versions is received, providing information from the registry for one or more datasets to a sender of such query call; and
if a remove request for a particular identified dataset version is received from a publisher device, removing information for the particular identified dataset version from the registry so that the particular identified dataset version is not published to any subscribers.

21. The computer program product of claim 20, wherein the predefined format of the publish request further includes a namespace identity that is also associated with the dataset in the registry and the predefined format of each subscribe request for the dataset also includes the namespace identity, an executable and associated arguments for a command to be executed for each updated version of the dataset that is published, wherein the destination identity specifies a host device and a consumer identity, wherein the computer instructions are further operable to cause a computer device to perform the following operations:
for each automatically published updated version of each dataset, automatically invoking the command associated with such dataset, wherein the command is invoked at the specified host device.

\* \* \* \* \*